United States Patent [19]
Morin

[11] 3,965,485
[45] June 22, 1976

[54] DRIVE MECHANISM FOR A DISC-SHAPED CODE CARRIER

[75] Inventor: Ulf Hasso Kennert Morin, Malmo, Sweden

[73] Assignee: Aktiebolaget Addo, Malmo, Sweden

[22] Filed: Sept. 11, 1974

[21] Appl. No.: 505,023

[30] Foreign Application Priority Data
Sept. 13, 1973 Sweden .............................. 7312475

[52] U.S. Cl. .................................. 360/98; 360/86; 360/135
[51] Int. Cl.² ..................... G11B 5/81; G11B 17/04; G11B 25/04
[58] Field of Search ................. 360/97, 98, 86, 135; 74/445; 346/137; 274/39 A

[56] References Cited
UNITED STATES PATENTS

| | | |
|---|---|---|
| 3,678,481 | 7/1972 | Dalziel et al. ......................... 360/97 |
| 3,770,908 | 11/1973 | Craggs ................................... 360/97 |
| 3,789,160 | 1/1974 | Bruer et al. ........................... 360/86 |
| 3,845,502 | 10/1974 | Paus ...................................... 360/86 |
| 3,846,836 | 11/1974 | Masse et al. .......................... 360/98 |

*Primary Examiner*—Alfred H. Eddleman
*Attorney, Agent, or Firm*—Alfred E. Miller

[57] ABSTRACT

A drive assembly for a single or pair of magnetic disc-shaped code carriers which co-act with at least one magnetic head for recording or reading information. The disc may be moved radially adjacent to the contact surface of the drive element without obstruction, and either disc can be removed and replaced with another disc even while the drive assembly is operative.

8 Claims, 2 Drawing Figures

DRIVE MECHANISM FOR A DISC-SHAPED CODE CARRIER

BACKGROUND OF THE INVENTION

Code carriers of the magnetic disc type are generally driven by driving means known in the prior art which comprise a shaft having a pulley on one end and a conical part at the other end. The shaft is mounted in a bearing assembly. The code carrier usually takes the form of a magnetic disc with a center opening that is fitted over the aforesaid conical part in order to properly center the disc. The disc is furthermore clamped between a movable holder and a further holder which is associated with the shaft in order to rotate the disc with the shaft.

A serious disadvantage of the above-described assembly is that the magnetic disc must be moved axially in a direction over the conical part before it can be removed in a radial direction, thus making it slower and more difficult to exchange magnetic discs. In addition, the construction of the drive mechanism is more complicated than should be necessary.

An object of the present invention is to construct a drive assembly for a disc-shaped code carrier in which discs can be replaced, or a disc can be exchanged for another disc without affecting the other disc.

A further object of the present invention is to provide a drive mechanism with a rotatable drive element having at least one contact surface co-acting with a code carrier and being provided with at least one guide surface.

Another object of the present invention is to provide at least one centering device that is movable in the axial direction of the drive element and is provided with a further guide surface, which co-acts with the guide surface of the drive element as well as the central opening in the code carrier.

The drive mechanism is further provided with a retaining member by which the code carrier can be firmly held against the contact surface of the drive element.

The invention will now be more fully described with reference to the accompanying drawings, in which:

FIG. 1 is a vertical sectional view of the drive mechanism for a disc-shaped code carrier constructed in accordance with the teachings of the present invention; and FIG. 2 is a perspective view of some of the details of the mechanism shown in FIG. 1.

DESCRIPTION OF THE PREFERRED EMBODIMENT

Figure 2:
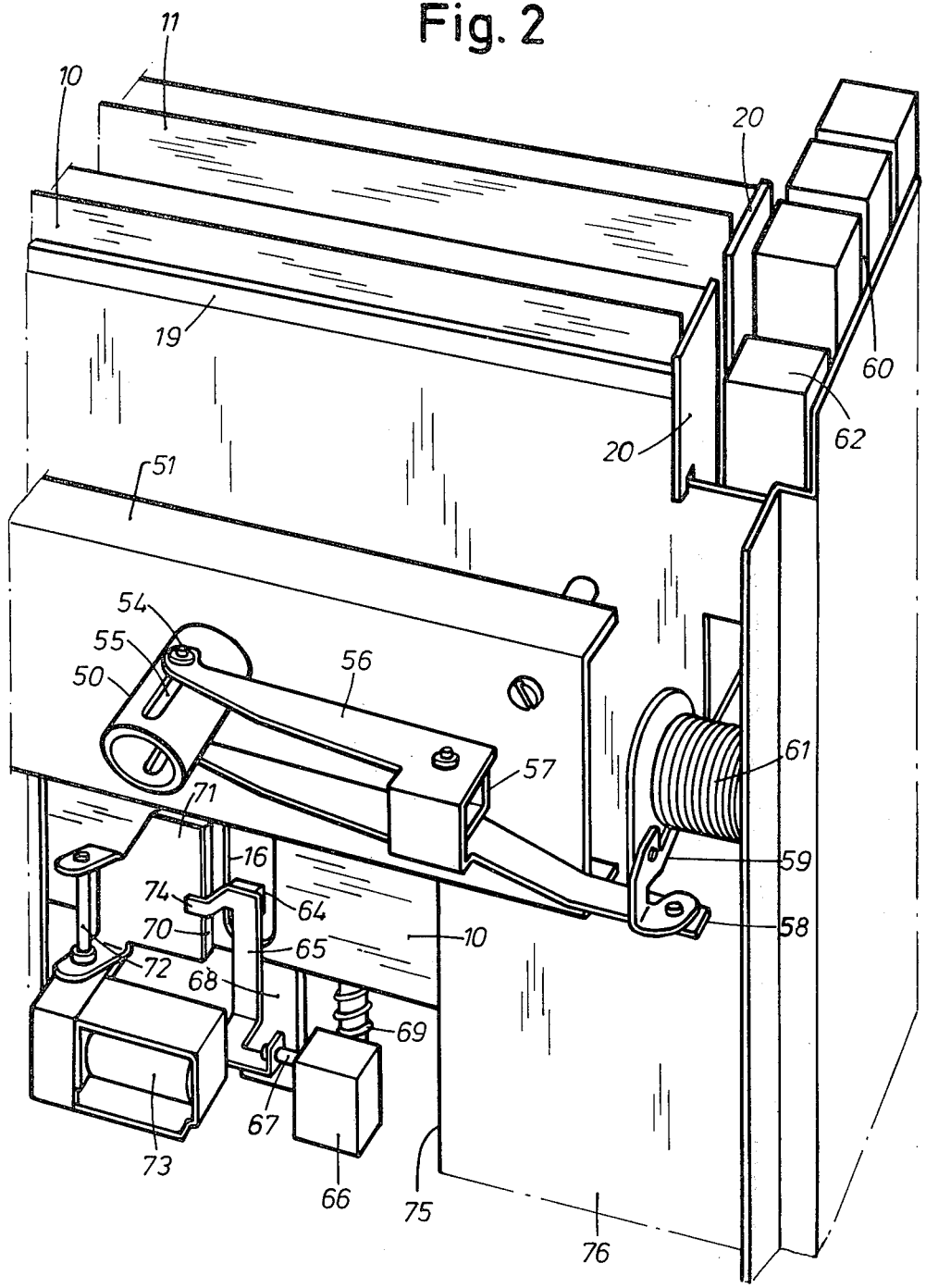

Referring to the drawings, the two cartridges 10 and 11 are shown having magnetic discs 12 and 13 therein. The magnetic discs may be of the type which are permanently enclosed in a cartridge. Each cartridge has a central opening 14 and each magnetic disc is provided with a smaller central opening 15. As seen in FIG. 2, each cartridge, in addition, is provided with an elliptical opening 16 by which the magnetic disc, for example, may be brought into contact with a magnetic head (not shown) for reading and for recording of information.

The drive mechanism or assembly of the invention has two slots 17 with insert openings 18 and guide plates 19, while the cartridges are guided laterally by guide plates 20.

Figure 1:
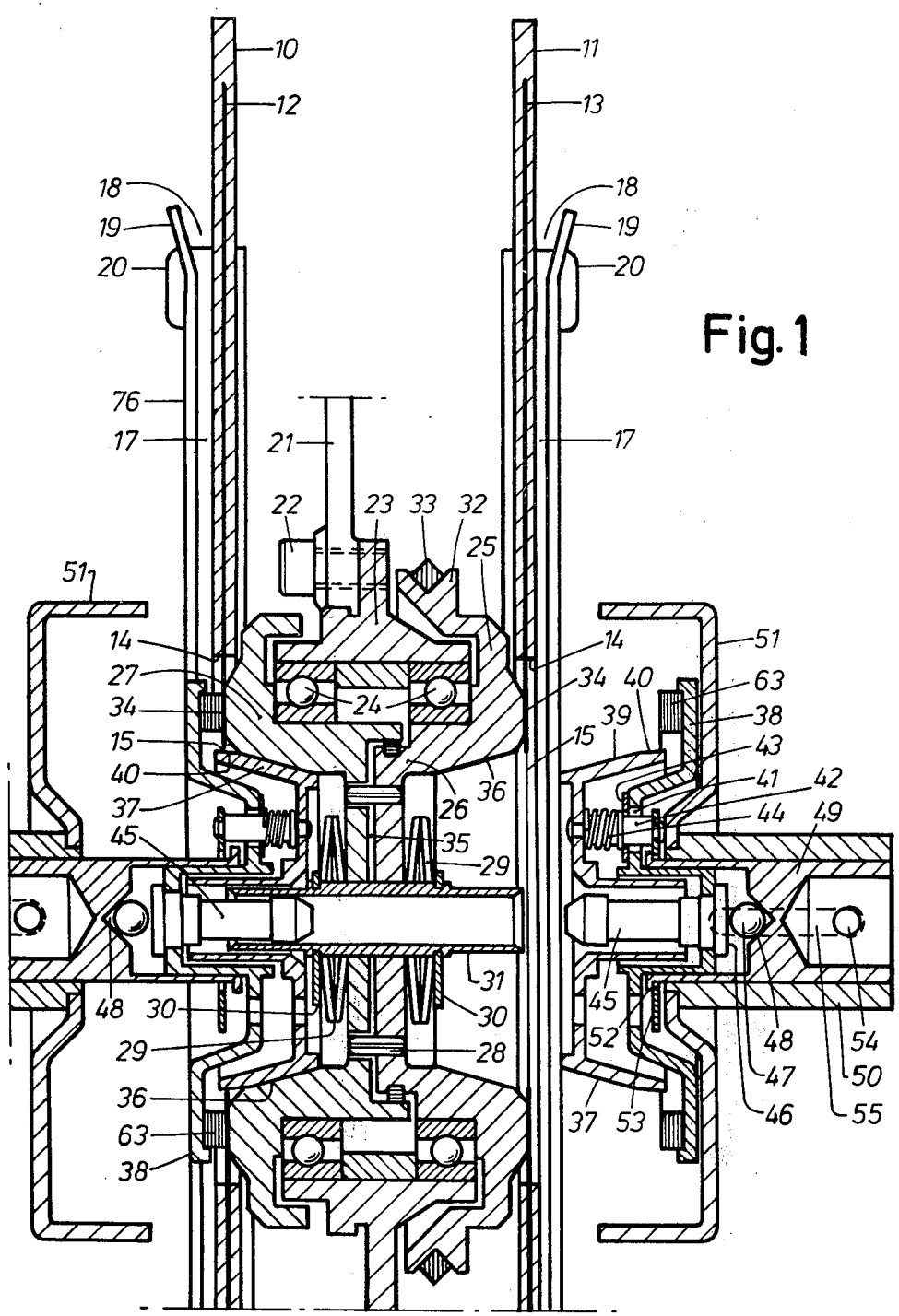

As seen in FIG. 1, an annular cage 23 is illustrated with two ball bearing assemblies. The cage 23 is secured to a support 21 by a screw fastening 22. To ensure stability, the ball bearings 24 are widely spaced. The moving parts of the bearings are operatively connected to a drive element 25 comprising two parts 26 and 27 which are mounted on a hollow shaft 31 by means of pins 28, spring washers 29, and lock washers 30. The part 26 of the drive element 25 is provided with a pulley 32 and a V-belt 33. The drive element 25 may be rotated relative to the stationary annular cage 23 by means of the V-belt 33.

The drive element 25 is further provided with annular flat surfaces 34 adjacent to those parts of the magnetic discs 12 and 13 which are located between the edges of the openings 14 and 15, respectively. If the magnetic discs are urges against the surfaces 34, as seen in FIG. 1, they will rotate with the rotating drive element 25. At either side of its central portion 35, the drive elements 26 and 27 are provided with bevelled surfaces 36, the function of which will be described hereinafter.

Adjacent to each slot 17 there is provided a centering device 37 and a retainer 38, respectively. The lefthand part of FIG. 1 shows the centering device and the retainer maintaining disc 12 in a centered position relative to the drive element 25. In the righthand part of FIG. 1, the centering device and the retainer are separated from the drive element, and the cartridge 11 with the magnetic disc 13 can be easily removed from the slot 17 in a radial direction.

Each centering device 37 has a bevelled surface 39 which can be moved to engage the respective bevelled surface 36 of the drive element 25. In this manner, the centering device will be accurately centered relative to the drive element. The centering device 37 is provided with another bevelled surface 40 and, as seen in the lefthand part of FIG. 1, the surface 40 can be caused to engage the edges of the openings 15 in the magnetic discs. When this occurs, the magnetic discs will be centered, and since the centering device 37 in turn is accurately centered relative to the drive element 25, the magnetic discs will also be precisely centered.

The retainers 38 are resiliently connected to the centering devices 37 by means of pins 42, which are movable in openings 41 and are associated with the centering devices 37, and additionally by means of washers 43 and springs 44. The retainers 38 are also connected to guide spindles 45 that are adapted for insertion in the hollow shaft 31. At one end of each spindle there is provided a bearing surface 46 for engagement with ball 47 that is captured in a recess 48 of an actuating member 49. The latter is in the form of a tube movably supported in an outer tube 50, which is in turn secured to a stationary supporting frame 51. The member 49 has a flange 52 engaging a disc 53 that is fastened to the pin 42. Accordingly, the springs 44 urge the retainer 38 and the actuating member 49 toward each other by means of flange 52 and disc 53, so that the bearing surface 46 and the adjacent ball 47 are always in contact.

As seen in FIGS. 1 and 2, each actuating member 49 has a guide pin 54 extending through slots 55 in the outer tube 50. For the sake of clarity, the slots 55 in FIG. 1 are shown in a position turned through an angle of 90° compared to what is shown in FIG. 2. As appears from the latter figure, the pin 54 is connected to a double lever arm 56, which is supported in a bracket 57, the latter being attached to the frame 51. As seen in FIG. 2, the other end 58 of the lever arm 56 is pivoted on an arm 59 which, in a manner not shown, is connected to operating means in the form of of set of buttons 60. The arm 59 is also connected to a spring element 61 which takes part in the operation of the assembly.

In FIG. 2, when the button 62 is depressed, the lever arm 56 moves the actuating member 49 toward the drive element 25 (FIG. 1). At the same time as the guide spindle 45 of the retainer 38 is inserted in the hollow shaft 31 and the centering device 37 is moved so as to engage the drive element 25. The magnetic disc 12 or 13 will thus be centered as described above. Then the actuating member 49 continues its movement toward the drive element 25 with the springs 44 being compressed so that the retainer 38 is moved further linearly toward the drive element 25. When this occurs, a pressure ring 63 associated with the retainer 38 will press the magnetic disc firmly against the flat surface 34 of the drive element 25. The magnetic disc will then be locked in a centered position relative to the drive 25 and will rotate together with the latter. To remove the disc, the button 62 is released, and as a result thereof, the lever arm 56 moves back and the arrangement will again assume the position shown in the righthand part of FIG. 1. In this manner, the magnetic discs can be quickly exchanged during operation of the system.

When a cartridge with magnetic disc has been inserted in a slot 17, a magnetic head (not shown) is brought into contact with the disc. The magnetic head is placed in the elliptical opening 16 of the cartridge. As shown in FIG. 2, a pressure pad 64 is placed opposite the magnetic head for reading out or recording. The pressure pad is attached to a lever arm 65 and is pivotally supported in a vertically movable unit 66 by means of pin 67. The magnetic head is mounted on a support 68 which is connected to the unit 66. The unit 66 and hence also the magnetic head and the pressure pad 64 can be elevated or lowered simultaneously by a rotatable screw 69 when the magnetic disc in a known manner is scanned by the magnetic head.

An additional pressure pad 70 is pressed against the cartridge for reading out or recording. This pad is fixed to a support 71 which is pivotable on a shaft 72. The pivoting movement of pad 70 is caused by a control relay 73. Furthermore, a lever arm 65 is provided with a tab 74 engaging the support 71. The vertically movable pressure pad 64 is thus moved out of or into contact with the corresponding magnetic disc when the relay 73 and the support 71 are operated. As seen in FIGS. 1 and 2, the lastmentioned details are disposed in an opening 75 in a wall 76 of one of the slots 17.

The pressure pads 64 and 70, as well as the pressure ring 63, can be of a known plastic or resilient material.

The present drive mechanism for disc-shaped code carriers which co-act with magnetic heads is so constructed that the discs are easily replaced and exchanged independently of each other. The foregoing can be accomplished even while the drive element is rotating.

What is claimed is:

1. Drive mechanism for disc-shaped code carrier having a central opening and which is adapted to co-act with a magnetic head or the like for recording or reading information comprising: a drive element having contact surfaces arranged on opposite sides thereof and adapted to co-act with an adjacent code carrier, means for rotating said drive element, said drive element also being provided with bevelled guide surfaces on opposite locations thereof, and separate centering devices being movable in an axial direction along a line co-extensive with the central axis of said drive element, each of said centering devices having correspondingly bevelled guide surfaces co-acting with a corresponding guide surface of said drive element and with the edge of the code carrier adjacent to said central opening.

2. The combination as claimed in claim 1 further comprising a structure movable co-axially with said centering device and provided with a retaining member which presses a part of said code carrier against said contact surface of the drive element when said structure is moved to a predetermined position adjacent to said drive element.

3. The combination as claimed in claim 2 wherein said retaining member is a flat annular element.

4. The combination as claimed in claim 2 further comprising resilient connection means between said centering device and said movable structure whereby when said centering device and movable structure move toward said drive element the co-operating guide surfaces on said centering device and drive element as well as the edges of the central opening of the code carrier are engaged before said retaining member is pressed against a part of the code carrier.

5. The combination as claimed in claim 1 further comprising a plurality of support members each being provided with a slot extending adjacent to the plane of an adjacent contact surface, said code carriers being selectively inserted or removed from said slots.

6. The combination as claimed in claim 1 wherein said means for rotating said drive element is a belt pulley.

7. The combination as claimed in claim 1 wherein said drive element is provided with a hollow shaft extending in the direction of movement of said centering device, a guide spindle operatively connected to said movable structure and which is inserted in said hollow shaft when said movable structure moves to a position in proximity to said drive element.

8. The combination as claimed in claim 7 further comprising an actuating member operatively connected to said movable structure and centering device, a finger actuated button, and a lever arm operatively connecting said button to said actuating member whereby upon depressing said button said actuating member is moved toward said drive element.

\* \* \* \* \*